(12) United States Patent
Wang et al.

(10) Patent No.: US 10,672,395 B2
(45) Date of Patent: Jun. 2, 2020

(54) VOICE CONTROL SYSTEM AND METHOD FOR VOICE SELECTION, AND SMART ROBOT USING THE SAME

(71) Applicant: AROBOT INNOVATION CO., LTD., New Taipei (TW)

(72) Inventors: Rou-Wen Wang, Changhua County (TW); Hung-Pin Kuo, New Taipei (TW); Yin Chuan Hsu, Yunlin County (TW); Hsiang Han Liu, Taipei (TW)

(73) Assignee: ADATA TECHNOLOGY CO., LTD., New Taipei (TW)

( * ) Notice: Subject to any disclaimer, the term of this patent is extended or adjusted under 35 U.S.C. 154(b) by 273 days.

(21) Appl. No.: 15/949,105

(22) Filed: Apr. 10, 2018

(65) Prior Publication Data

US 2019/0198018 A1 Jun. 27, 2019

(30) Foreign Application Priority Data

Dec. 22, 2017 (TW) .............................. 106145299 A (51) Int. Cl.
*G10L 15/22* (2006.01)
*G10L 15/18* (2013.01)
*G10L 25/78* (2013.01)
*G06F 3/16* (2006.01)
*G10L 15/08* (2006.01)

(52) U.S. Cl.
CPC .............. *G10L 15/22* (2013.01); *G06F 3/167* (2013.01); *G10L 15/18* (2013.01); *G10L 25/78* (2013.01); *G10L 2015/088* (2013.01); *G10L 2015/223* (2013.01)

(58) Field of Classification Search
CPC ......... G10L 15/22; G10L 15/18; G10L 25/78; G06F 3/167
See application file for complete search history.

(56) References Cited

U.S. PATENT DOCUMENTS

| 9,495,959 | B2* | 11/2016 | Halash | G10L 15/19 |
| 10,430,156 | B2* | 10/2019 | Grobauer | G10L 15/22 |
| 10,504,509 | B2* | 12/2019 | Aggarwal | G06F 3/167 |
| 2011/0210849 | A1* | 9/2011 | Howard | H04W 64/00 340/539.32 |
| 2013/0218574 | A1* | 8/2013 | Falcon | G01C 21/26 704/275 |

(Continued)

*Primary Examiner* — Mohammad K Islam
(74) *Attorney, Agent, or Firm* — Li & Cai Intellectual Property (USA) Office (57) ABSTRACT

Disclosed are a voice control system, a method for selecting options and a smart robot using the same. The method includes: detecting whether there is any first command sentence in a voice signal; determining a set of the voice options corresponding to the first command sentence; sequentially playing each voice option of the set of voice options, wherein there is a predetermined time interval between every two voice options; within the predetermined time interval, detecting whether there is a response sentence in the voice signal; determining whether the response sentence matches with one of the voice options when there is the response sentence in the voice signal; and if the response sentence matches with one of the voice options, outputting the task content corresponding to the voice option and then making the voice control system enter a sleep mode.

18 Claims, 3 Drawing Sheets

(56) References Cited

U.S. PATENT DOCUMENTS

| | | | | |
|---|---|---|---|---|
| 2013/0275875 | A1* | 10/2013 | Gruber | G06F 3/167 |
| | | | | 715/728 |
| 2014/0108017 | A1* | 4/2014 | Mason | G10L 13/00 |
| | | | | 704/270.1 |
| 2016/0098992 | A1* | 4/2016 | Renard | G10L 15/18 |
| | | | | 704/275 |
| 2016/0133255 | A1* | 5/2016 | Haiut | G10L 15/22 |
| | | | | 704/275 |
| 2016/0210965 | A1* | 7/2016 | Mun | G10L 15/22 |
| 2016/0358603 | A1* | 12/2016 | Azam | G10L 15/22 |
| 2017/0011745 | A1* | 1/2017 | Navaratnam | G06F 17/30654 |
| 2017/0018276 | A1* | 1/2017 | Gunn | G10L 15/22 |
| 2017/0344195 | A1* | 11/2017 | Thomas | H04N 21/4751 |
| 2017/0352350 | A1* | 12/2017 | Booker | G10L 15/22 |
| 2018/0158460 | A1* | 6/2018 | Lee | H05B 47/19 |
| 2018/0174581 | A1* | 6/2018 | Wang | G10L 15/22 |
| 2018/0260680 | A1* | 9/2018 | Finkelstein | G06F 3/167 |
| 2018/0308490 | A1* | 10/2018 | Lim | G10L 15/18 |
| 2018/0322872 | A1* | 11/2018 | Cha | G10L 25/63 |
| 2019/0027152 | A1* | 1/2019 | Huang | G10L 21/0208 |
| 2019/0043488 | A1* | 2/2019 | Bocklet | G06N 3/063 |
| 2019/0115025 | A1* | 4/2019 | Choi | G10L 15/22 |
| 2019/0187787 | A1* | 6/2019 | White | G06N 20/00 |
| 2019/0198020 | A1* | 6/2019 | Li | G10L 15/22 |
| 2019/0206399 | A1* | 7/2019 | Garmark | G10L 15/22 |
| 2019/0207777 | A1* | 7/2019 | Patel | H04L 12/12 |
| 2019/0214010 | A1* | 7/2019 | Ma | G05D 1/0255 |
| 2019/0237089 | A1* | 8/2019 | Shin | G10L 15/04 |
| 2019/0275680 | A1* | 9/2019 | Zhuang | B25J 19/026 |

* cited by examiner

VOICE CONTROL SYSTEM AND METHOD FOR VOICE SELECTION, AND SMART ROBOT USING THE SAME

BACKGROUND OF THE INVENTION

1. Field of the Invention

The present disclosure relates to a voice control system, a method for voice selection and a smart robot using the same; in particular, to a voice control system, a method for voice selection and a smart robot that can clearly provide a user with options to select from and then correctly recognize the option chosen by the user.

2. Description of Related Art

Generally, a robot refers to a machine device that can automatically execute assigned tasks. A robot can be controlled based on some simple logic circuits or advanced computer programs. Thus, a robot is usually a high-end mechatronic device. In recent years, many new technologies in robotics have been developed, giving birth to different types of robots such as the industrial robot, the service robot and the like.

For convenience considerations, service robots with various applications have become much more accepted by people, such as a personal companion robot, a domestic-use robot or a professional service robot. These robots are capable of recognizing the meaning of what a user says and accordingly interacts with the user or provides relevant services to the user.

When a user issues a command, the robot may provide the user with several options based on its built-in program. However, misjudgments may often occur due to interferences resulting from background noises. Also, the user can often only issue a command after the robot has specified all available options. In addition, the robot can accurately recognize the command delivered by the user only when the command completely matches with one of the options provided by the robot. However, in some languages, such as Chinese, different words often have the same pronunciation. Therefore, even if the command voiced by the user sounds extremely similar to one of the options provided by the robot, the robot may still be unable to correctly recognize the command, which is lacking in user-friendliness.

SUMMARY OF THE INVENTION

To overcome the above disadvantages, the present disclosure provides a voice control system, a method for selecting options and a smart robot that can clearly provide voice options to a user and then appropriately recognize which voice option is chosen by the user.

The voice control system provided by the present disclosure enters a sleep mode or a working mode, and includes an audio detection device, a memory and a processor. The processor is connected to the audio detection device and the memory. When the voice control system enters the sleep mode, the audio detection device continuously detects whether there is a wake-up sentence in a voice signal received by a receiver. The memory stores an interaction program and a database. It should be noted that, a plurality of first command sentences, sets of voice options and a plurality of task contents are stored in the database, each first command sentence corresponds to one set of the voice options, and each voice option corresponds to one of the task contents.

When the wake-up sentence is detected, the audio detection device generates an indication signal for waking up the processor. The voice control system operates in the working mode after the processor is woken up by the indication signal. In the working mode, the processor executes the interaction program to: control the audio detection device to detect whether there is any first command sentence in the voice signal received by the receiver; determine the set of the voice options corresponding to the first command sentence; through a player, sequentially play each voice option of the set of the voice options, wherein there is a predetermined time interval between every two voice options played by the player; within the predetermined time interval, control the audio detection device to detect whether there is a response sentence in the voice signal received by the receiver; determine whether the response sentence matches with one of the voice options when there is the response sentence in the voice signal received by the receiver; and if the response sentence matches with one of the voice options, output the task content corresponding to the voice option and then make the voice control system enters the sleep mode.

In addition, the method for selecting options provided by the present disclosure is adapted to the voice control system provided by the present disclosure. Specifically, the method is implemented through the interaction program executed by the voice control system. Moreover, the smart robot provided by the present disclosure includes a CPU (Central Processing Unit) and the voice control system described above. The CPU generates a control signal according to the task content outputted from the voice control system, such that the smart robot executes an action according to the control signal.

In the present disclosure, there is a time interval between every two voice options played by the player. Thus, a user can deliver a response sentence within the time interval instead of delivering it after all voice options are played. Moreover, during the time when the voice options are played, the present disclosure stops detecting whether there is a command sentence in a voice signal received by the receiver. In this manner, the instances of misjudgment can be significantly reduced.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

The major feature of the present disclosure is that it can clearly provide voice options to a user and accurately recognize the voice option that is chosen by the user. Several embodiments are provided in the following descriptions for illustrating the voice control system, the method for selecting options and the smart robot using the same disclosed by the present disclosure.

[One Embodiment of the Voice Control System]

Figure 1:
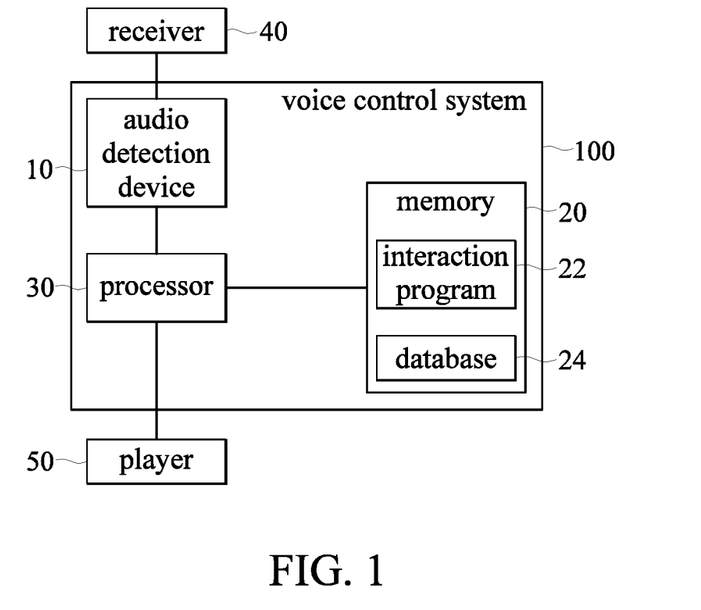
FIG. 1 shows a block diagram of a voice control system according to one embodiment of the present disclosure.

Referring to FIG. 1, a block diagram of a voice control system according to one embodiment of the present disclosure is shown, and the structure of the voice control system in this embodiment is described in the following descriptions.

As shown in FIG. 1, the voice control system 100 includes an audio detection device 10, a memory 20 and a processor 30. The processor 30 is connected to the detection device 10 and the memory 20. The memory 20 is configured to store an interaction program 22 and a database 24. A plurality of first command sentences, sets of voice options and a plurality of task contents are stored in the database 24. Each first command sentence corresponds to one set of the voice options, and each voice option corresponds to one of the task contents.

The voice control system 100 enters a sleep mode or a working mode. When the voice control system 100 enters the sleep mode, the audio detection device 10 continuously detects whether there is a wake-up sentence in a voice signal received by a receiver 40 (e.g. a microphone). When the wake-up sentence is detected, the audio detection device 10 generates an indication signal to wake up the processor 30. Once the processor 30 is woken up, the voice control system 100 operates in the working mode.

The working mechanism of the voice control system 100 is that, when the voice control system 100 operates in the working mode, the processor 30 executes the interaction program 22 to provide several voice options according to the command sentence delivered by a user, and then outputs a task content corresponding to one of the voice options according to a response sentence delivered by the user.

It should be noted that, details about generating the indication signal to wake up the processor 30 when the wake-up sentence is detected should be easily understood by those skilled in the art, and thus the relevant descriptions are omitted herein. It should also be noted that, the audio detection device 10, the memory 20 and the processor 30 of the voice control system 100 can be implemented by firmware, or any combination of suitable hardware, firmware and software.

[One Embodiment of the Method for Selecting Options]

Figure 2:
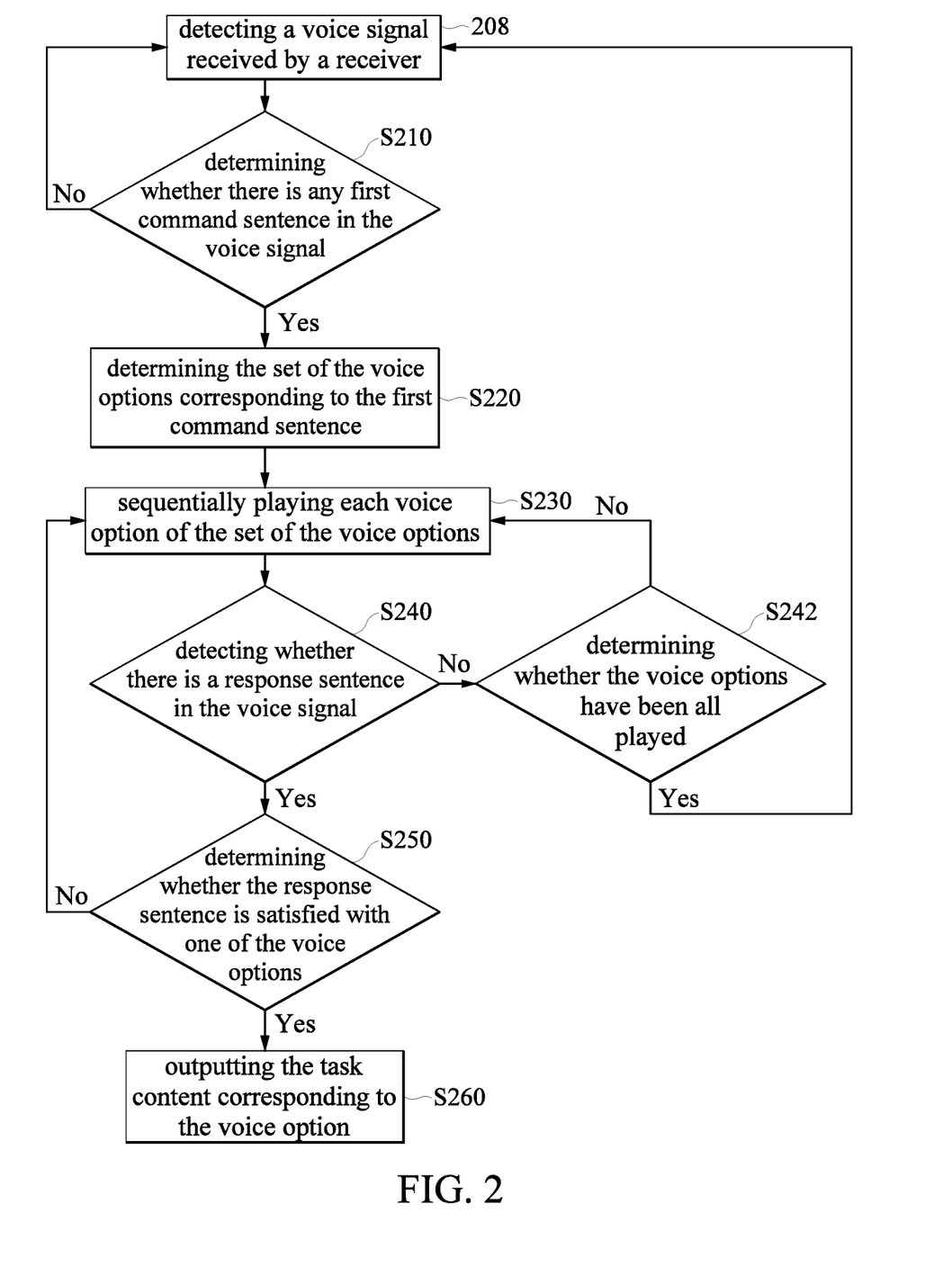
FIG. 2 shows a flow chart of a method for selecting options according to one embodiment of the present disclosure.

Referring to FIG. 2, a flow chart of a method for selecting options according to one embodiment of the present disclosure is shown.

The method for selecting options in this embodiment is implemented by the interaction program 22 stored in the memory 20 and is executed by the processor 30 of the voice control system 100 shown in FIG. 1. Therefore, FIG. 1 and FIG. 2 should be read in conjunction for better understanding of the method. As shown in FIG. 2, the method includes steps as follows: detecting a voice signal received by a receiver and determining whether there is any first command sentence in the voice signal (step S208 and step S210); determining the set of the voice options corresponding to the first command sentence (step S220); sequentially playing each voice option of the set of the voice options (step S230); detecting whether there is a response sentence in the voice signal, and determining whether the voice options have all been played (step S240 and step S242); determining whether the response sentence matches with one of the voice options (step S250); and outputting a task content corresponding to the voice option (step S260).

Details of each step of the method for selecting options in this embodiment are described in the following descriptions.

After the processor 30 is woken up such that the voice control system 100 operates in the working mode, the method goes to step S208 and step S210. In the step S208 and step S210, the processor 30 controls the audio detection device 10 to detect a voice signal received by a receiver 40 for determining whether there is any first command sentence in the voice signal. For example, the first command sentence can be "sing a song", "tell a story" or the like. Through the interaction program 22, the first command sentences can be preset by a system designer, or new first command sentences can be added by the user. It should be noted that, after receiving the voice signal from the receiver 40, the audio detection device 10 processes the voice signal and compares the processed voice signal with the first command sentences; however, those skilled in the art should be familiar with general details about voice signal processing, and thus the relevant descriptions are omitted herein.

For example, one first command sentence (such as "tell a story") in the voice signal received by the receiver 40 has been detected by the audio detection device 10, the method goes to step S220. In step S220, through the database 24, the processor 30 determines a set of voice options corresponding to the first command sentence "tell a story". For instance, the set of voice options corresponding to the first command sentence "tell a story" may include "the first option", "the second option" and "the third option", and the first option may be "Little Red Riding Hood", the second option may be "The Ugly Duckling" and the third option may be "Snow White", but it is not limited thereto. Through the interaction program 22, these voice options can be preset by a system designer, or new voice options can be added by the user.

After the set of voice options corresponding to the first command sentence "tell a story" is determined, the method goes to step S230 and step S240. In step S230, the processor 30 controls a player 50 (e.g. a speaker) to sequentially play each voice option of the set of the voice options. It is worth mentioning that, every time one voice option is played, the processor 30 counts for a predetermined time interval and then again controls the player 50 to play the next voice option. In step S240, within each predetermined time interval, the processor 30 determines whether there is a response sentence in the voice signal received by the receiver 40. In other words, instead of delivering a response sentence after all voice options are played, the user can deliver a response sentence within each predetermined time interval.

It is also worth mentioning that, during the time when the processor 30 controls the player 50 to play the voice options, the processor 30 simultaneously controls the audio detection device 10 to stop detecting the voice signal received by the receiver 40. However, within each predetermined time interval, the processor 30 will control the audio detection device 10 to restart the detection of the voice signal received by the receiver 40. In this manner, during the time when the player 50 is playing the voice options, there will not be any misjudgment because the voice options are played by the player 50 but not received by the receiver 40.

Moreover, in this embodiment, within the predetermined time interval, if the amplitude of the voice signal received by the receiver 40 is larger than a threshold value, it indicates that the user is probably delivering a response sentence. In this case, the processor 30 will extend the predetermined time interval to avoid the situation where the response sentence cannot be detected when it is delivered later and the predetermined time interval is not long enough. For instance, the predetermined time interval may be 3 seconds. When the amplitude of the voice signal received by the receiver 40 is larger than the threshold value, the processor 30 will extend the predetermined time interval to 5 seconds or 7 seconds. It should be noted that, through the interaction program 22, the predetermined time interval can be preset by a system designer and reset by a user.

It is worth mentioning that, every time the predetermined time interval ends, the method goes to step S242. In step S242, the processor 30 determines whether the voice options have all been played. If the voice options have not yet all been played, the method returns to step S230, wherein the processor 30 controls the player 50 to continue sequentially playing the remaining voice options. On the other hand, if the voice options have already all been played, the method returns to step S208 and step S210 to again determine whether there is any first command sentence detected in the voice signal received by the receiver 40.

Within the predetermined time interval, once the processor 30 determines that there is a response sentence detected in the voice signal received by the receiver 40, the method goes to step S250. In step S250, the processor 30 determines whether the response sentence matches with one of the voice options.

Figure 3:
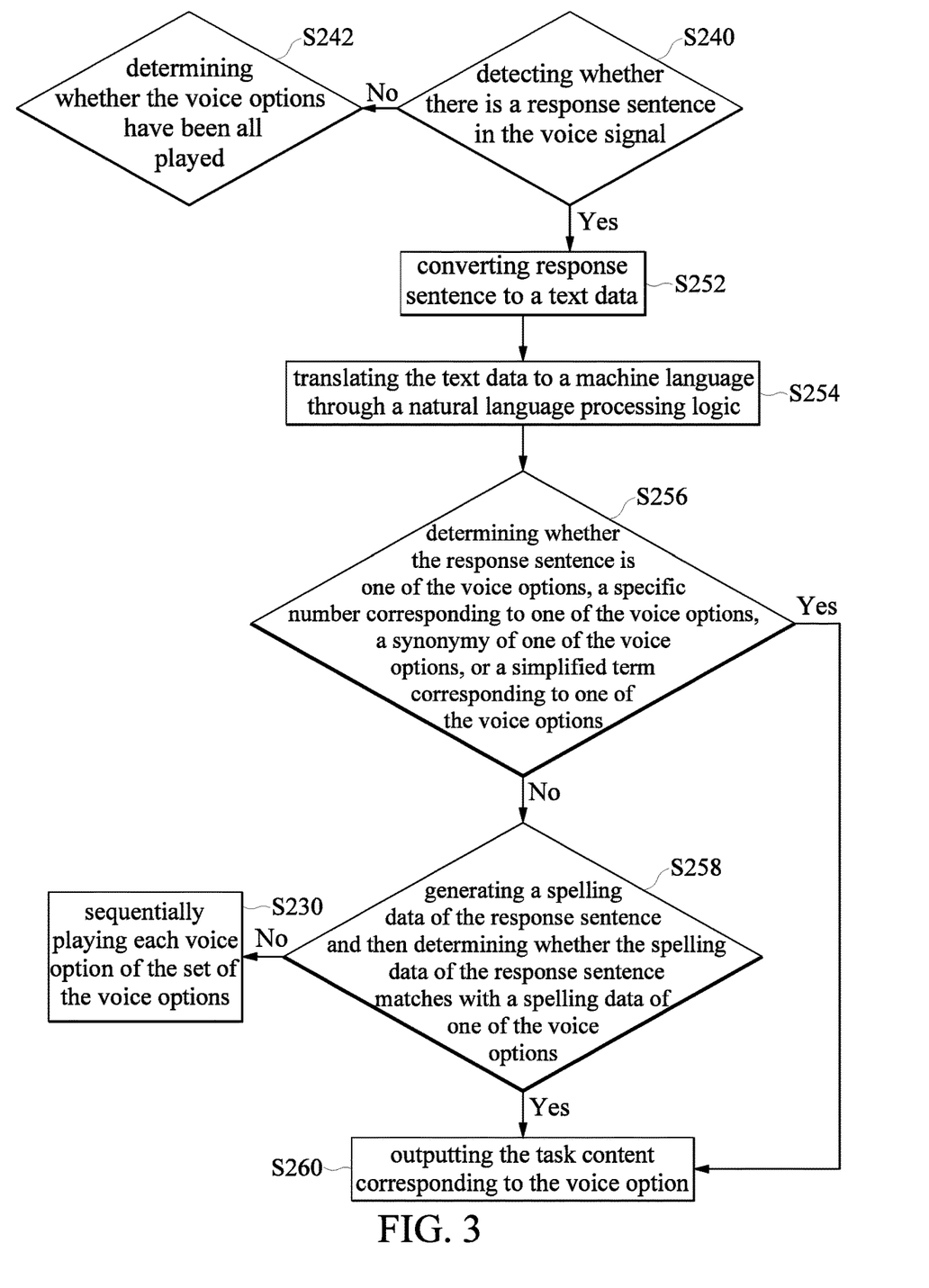
FIG. 3 shows a flow chart of the step S250 of the method for selecting options according to one embodiment of the present disclosure.

Referring to FIG. 3, a flow chart of the step S250 of the method for selecting options according to one embodiment of the present disclosure is shown. As shown in FIG. 3, step S250 is implemented by steps as follows: converting a response sentence to a text data (step S252); translating the text data to a machine language through a natural language processing logic (step S254); determining whether the response sentence is one of the voice options, a specific number corresponding to one of the voice options, a synonymy of one of the voice options, or a simplified term corresponding to one of the voice options (step S256); and generating a spelling data of the response sentence and then determining whether the spelling data of the response sentence matches with a spelling data of one of the voice options (step S258).

In step S252, the processor 30 converts the response sentence to a text data. For example, the processor 30 can convert the response sentence to a text data by using a STT (Speech-To-Text; STT) algorithm. In other words, by using the STT algorithm, the processor 30 can convert the response sentence delivered by the user to words that can be written down. After that, in step S254, the processor 30 translates the text data to a machine language through an NLP (Natural Language Processing; NLP) logic. In other words, through the NLP logic, the processor 30 can translate the text data corresponding to the response sentence to a machine language that is readable for the processor 30. By executing steps S252 and S254, the machine language corresponding to the response sentence delivered by the user can be obtained, and according to the machine language, the processor 30 can determine whether the response sentence matches with one of the voice options.

In order to appropriately determine whether the response sentence delivered by the user matches with one of the voice options, the processor 30 executes steps S256 and S258.

In step S256, the processor 30 compares the response sentence delivered by the user with the voice options, a specific number corresponding to each voice option, a synonymy of each voice option, or a simplified term corresponding to each voice option. In the above case, the set of voice options corresponding to the first command sentence "tell a story" includes "the first option", "the second option" and "the third option". In this case, if the response sentence delivered by the user matches with "the first option", "the second option" or "the third option" (i.e., the complete description of the voice options), the processor 30 can determine the voice option chosen by the user according to the response sentence delivered by the user. Or, if the response sentence delivered by the user matches with "1", "2" or "3" (i.e., a specific number corresponding to each voice option), the processor 30 can also determine the voice option chosen by the user according to the response sentence delivered by the user. In addition, if the response sentence delivered by the user is matches with "choice one", "choice two" or "choice three" (i.e., a synonymy of each voice option), the processor 30 can also determine the voice option chosen by the user according to the response sentence delivered by the user. Moreover, if the response sentence delivered by the user matches with "option one", "option two" or "option three" (i.e., a simplified term corresponding to each voice option), the processor 30 can still determine the voice option chosen by the user according to the response sentence delivered by the user.

In step S256, if the processor 30 has determined the voice option chosen by the user according to the response sentence delivered by the user, the method goes to step S260. In step S260, the processor 30 will output a task content corresponding to the voice option chosen by the user.

However, in step S256, if the processor 30 cannot determine the voice option chosen by the user according to the response sentence delivered by the user, the method goes to step S258. In step S258, the processor 30 generates a spelling data of the response sentence and then determines whether the spelling data of the response sentence matches with a spelling data of one of the voice options. In the above example, if the voice options, such as "the first option", "the second option" and "the third option", are read in Chinese, which are "項目一", "項目二" and "項目三", the spelling data of these voice options will be "ㄒㄧㄤˋㄇㄨˋㄧ", "ㄒㄧㄤˋㄇㄨˋㄦˋ" and "ㄒㄧㄤˋㄇㄨˋㄙㄢ". If the response sentence delivered by the user is "項目二", then the processor 30 will generate the spelling data "ㄒㄧㄤˋㄇㄨˋㄦˋ" according to the machine language generated in the step S254. In this case, in step S258, the processor 30 can determine that the voice option chosen by the user is "項目二", and thus, in step S260, the processor 30 will output a control signal according to the task content (e.g., telling "The Ugly Duckling").

It is worth mentioning that, in this embodiment, the Chinese phonetic symbol is taken as an example of the spelling data; however, it is not restricted thereto. In other words, in other embodiments of the present disclosure, the spelling data can also be the phonetic symbols of other languages.

It is also worth mentioning that, although the method for selecting options is described according to FIG. 2 and FIG. 3, those skilled in the art should understand that the sequence of executing steps of the method is not restricted. In other words, in other embodiments, the sequence that steps of the method are executed may be varied. Also, some of the steps can be combined, or some steps may be omitted.

Therefore, although the processor 30 executes step S256 and then executes step S258 in FIG. 3 and the above descriptions, the sequence of executing step S256 and step S258 is not restricted. In other words, the processor 30 can also first execute step S258, and then execute step S256. In this case, if the processor 30 determines that the spelling data of the response sentence delivered by the user does not match with the spelling data of any of the voice options, the processor 30 further compares the response sentence with the voice options, a specific number corresponding to each voice option, a synonymy of each voice option, or a simplified term corresponding to each voice option.

Moreover, the processor 30 can also execute step S256 and step S258 at the same time. In this case, if step S256 is finished faster and the processor 30 can determine the voice option chosen by the user according to the response sentence by executing step S256, the execution of step S258 will be stopped. On the other hand, if step S258 is finished faster and the processor 30 can determine the voice option chosen by the user according to the response sentence by executing step S258, the execution of step S256 will be stopped.

[One Embodiment of the Smart Robot]

The smart robot in this embodiment includes a CPU (Central Processing Unit; CPU) and the voice control system described in any of the above embodiments. For example, the smart robot in this embodiment may be a personal companion robot or a domestic-use robot.

After the processor 30 outputs a control signal corresponding to the task content according to the voice option chosen by a user, the CPU will control the smart robot to execute relevant actions according to the control signal. Since the voice control system in any of the above embodiments can be configured in the smart robot in this embodiment, the receiver 40 in any of the above embodiments can be implemented by a microphone of the smart robot, and the player 50 in any of the above embodiments can be implemented by a speaker of the smart robot.

It is worth mentioning that, in this embodiment, the processor 30 of the voice control system can be a built-in processing unit of the smart robot. In this case, this built-in processing unit must be a high-end processing unit.

In other embodiments, in addition to a built-in processing unit of the robot, there may also be a cloud server as an external processor of the smart robot. In this case, if the built-in processing unit is a low-end processing unit, then the cloud server must be a high-end processing unit. Thus, when the smart robot is connected to the cloud server through the Internet, the processor 30 will be implemented by the cloud server, but when the smart robot is not connected to the cloud server, the processor 30 will be implemented by the built-in processing unit of the robot.

As described, the voice control system of any of the above embodiments is configured in the smart robot in this embodiment, and thus there will be a time interval between every two voice options provided by the smart robot. Therefore, a user can deliver a response sentence within the time interval instead of delivering the response sentence after all voice options are played. Moreover, during the time when the voice options are played, the smart robot stops detecting whether there is a command sentence in a voice signal received by a receiver. In this manner, the occurrence of misjudgment can be significantly reduced.

To sum up, in the present disclosure, there is a time interval between every two voice options provided according to a command sentence. Thus, a user can deliver a response sentence within the time interval instead of delivering the response sentence after all voice options are played. Moreover, during the time when the voice options are played, the present disclosure stops detecting whether there is a command sentence in a voice signal received by a receiver. In this manner, the occurrence of signal misjudgments can be significantly reduced.

Moreover, in the present disclosure, to correctly determine the voice option chosen by a user according to a response sentence delivered by the user, the response sentence will be compared with each of the voice options, a specific number corresponding to each voice option, a synonymy of each voice option, or a simplified term corresponding to each voice option. In addition, a spelling data is generated according to the machine language corresponding to the response sentence, and then the spelling data is compared with the spelling data of each of the voice options. In this manner, the present disclosure can accurately determine the voice option chosen by the user, and the occurrence of misjudgments when determining which voice option is chosen by the user can be significantly reduced.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A voice control system, entering a sleep mode or a working mode, comprising: an audio detection device, in the sleep mode continuously detecting whether there is a wake-up sentence in a voice signal received by a receiver, and generating an indication signal when the wake-up sentence is detected; a memory, storing an interaction program and a database, wherein a plurality of first command sentences, sets of voice options and a plurality of task contents are stored in the database, each first command sentence corresponds to one set of the voice options, and each voice option corresponds to one of the task contents; and a processor, connected to the audio detection device and the memory, wherein the voice control system operates in the working mode after the processor is woken up by the indication signal, and in the working mode the processor executes the interaction program to: control the audio detection device to detect whether there is any first command sentence in the voice signal received by the receiver; determine the set of the voice options corresponding to the first command sentence; through a player, sequentially play each voice option of the set of the voice options, wherein there is a predetermined time interval between every two voice options played by the player; within the predetermined time interval, control the audio detection device to detect whether there is a response sentence in a voice signal received by the receiver; determine whether the response sentence matches with one of the voice options when there is the response sentence in the voice signal received by the receiver; and if the response sentence matches with one of the voice options, output the task content corresponding to the voice option and then make the voice control system enter the sleep mode.

2. The voice control system according to claim 1, wherein when there is no response sentence detected in the voice signal received by the receiver, or when the response sentence does not match with any of the voice options, the processor further executes the interaction program to: determine whether the voice options have all been played; control the player to continue sequentially playing the remaining voice options when the voice options have not yet all been played; and control the audio detection device to detect whether there is any first command sentence in the voice signal received by the receiver when the voice options have all been played.

3. The voice control system according to claim 1, wherein when the processor controls the player to sequentially play each voice option of the set of the voice options, the audio detection device stops detecting the voice signal received by the receiver, but within the predetermined time interval, the audio detection device again detects the voice signal received by the receiver.

4. The voice control system according to claim 1, wherein within the predetermined time interval, the processor extends the predetermined time interval when the amplitude of the voice signal received by the receiver is larger than a threshold value.

5. The voice control system according to claim 1, wherein when determining whether the response sentence matches with one of the voice options, the processor further executes the interaction program to: convert a response sentence to a text data; translate the text data to a machine language through a natural language processing logic; and determine whether the response sentence matches with one of the voice options according to the machine language.

6. The voice control system according to claim 5, wherein when determining whether the response sentence matches with one of the voice options according to the machine language, the processor determines whether the response sentence is one of the voice options, a specific number corresponding to one of the voice options, a synonymy of one of the voice options, or a simplified term corresponding to one of the voice options.

7. The voice control system according to claim 6, wherein when the response sentence does not match with any of the voice options, the specific number corresponding to any of the voice options, the synonymy of any of the voice options, or the simplified term corresponding to any of the voice options, the processor generates a spelling data of the response sentence and then determines whether the spelling data of the response sentence matches with a spelling data of one of the voice options.

8. The voice control system according to claim 1, wherein a plurality of second command sentences are stored in the memory, each second command sentence corresponds to one of the task contents, and the processor further executes the interaction program further to: control the audio detection device to detect whether one of the second command sentences is in the voice signal received by the receiver; and output the task content corresponding to the second command sentence, and then make the voice control system enter the sleep mode.

9. A method for selecting options, adapted to a voice control system, wherein the voice control system enters a sleep mode or a working mode, the voice control system includes an audio detection device, a memory and a processor, a plurality of first command sentences, sets of voice options and a plurality of task contents are stored in the database, each first command sentence corresponds to one set of the voice options, each voice option corresponds to one of the task contents, the processor is connected to the audio detection device and the memory, the processor is configured to execute an interaction program to implement the method, and the method comprises: detecting whether there is any first command sentence in the voice signal received by a receiver; determining the set of the voice options corresponding to the first command sentence; through a player, sequentially playing each voice option of the set of the voice options, wherein there is a predetermined time interval between every two voice options played by the player; within the predetermined time interval, detecting whether there is a response sentence in a voice signal received by the receiver; determining whether the response sentence matches with one of the voice options when there is the response sentence in the voice signal received by the receiver; and if the response sentence matches with one of the voice options, outputting the task content corresponding to the voice option, and then making the voice control system enter the sleep mode.

10. The method according to claim 9, further comprising: determining whether the voice options have all been played; controlling the player to continue sequentially playing the remaining voice options when the voice options have not yet all been played; and controlling the audio detection device to detect whether there is any first command sentence in the voice signal received by the receiver when the voice options have all been played.

11. The method according to claim 9, further comprising: when the player sequentially plays each voice option of the set of the voice options, stopping detection of the voice signal received by the receiver, but within the predetermined time interval, restarting detection of the voice signal received by the receiver.

12. The method according to claim 9, further comprising: within the predetermined time interval, extending the predetermined time interval when the amplitude of the voice signal received by the receiver is larger than a threshold value.

13. The method according to claim 9, wherein the step of determining whether the response sentence matches with one of the voice options includes: converting a response sentence to a text data; translating the text data to a machine language through a natural language processing logic; and determining whether the response sentence matches with one of the voice options according to the machine language.

14. The method according to claim 13, wherein the step of determining whether the response sentence matches with one of the voice options according to the machine language includes: determining whether the response sentence is one of the voice options, a specific number corresponding to one of the voice options, a synonymy of one of the voice options, or a simplified term corresponding to one of the voice options.

15. The method according to claim 14, wherein the step of determining whether the response sentence does not match with one of the voice options according to the machine language further includes: generating a spelling data of the response sentence and then determining whether the spelling data of the response sentence matches with a spelling data of one of the voice options when the response sentence does not match with any of the voice options, the specific number corresponding to any of the voice options, the synonymy of any of the voice options, or the simplified term corresponding to any of the voice options.

16. The method according to claim 9, wherein a plurality of second command sentences are stored in the memory, each second command sentence corresponds to one of the task contents, and the method further comprises: controlling the audio detection device to detect whether one of the second command sentences is in the voice signal received by the receiver; and outputting the task content corresponding to the second command sentence, and then making the voice control system enter the sleep mode.

17. A smart robot, comprising: a CPU; and a voice control system according to claim 1, configured to provide a plurality of voice options according to a command sentence in a voice signal received by a receiver, recognize a response sentence and accordingly output a task content; wherein the CPU generates a control signal according to the task content such that the smart robot executes an action according to the control signal.

18. The smart robot according to claim 17, wherein in the voice control system, the processor is a built-in processing unit or a cloud server.

\* \* \* \* \*